United States Patent Office 3,140,301
Patented July 7, 1964

3,140,301
OXYGENATED TRITERPENOID ACID
DERIVATIVES
Josef Fried, Princeton, N.J., assignor to Olin Mathieson
Chemical Corporation, New York, N.Y., a corporation
of Virginia
No Drawing. Filed Apr. 19, 1962, Ser. No. 188,900
14 Claims. (Cl. 260—397.3)

This invention relates to, and has as its objects the provision of new, physiologically active steroids, methods for their production and new intermediates useful in said preparation.

The final products of this invention may be represented by the following formula

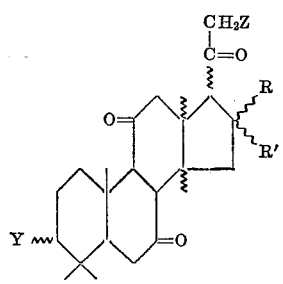

wherein Z is selected from the group consisting of hydrogen, hydroxy and acyloxy; Y is selected from the group consisting of hydrogen, hydroxy, acyloxy and oxo (O=); and R and R′ may be the same or different and are selected from the group consisting of hydrogen, hydroxy and acyloxy. (Whenever in this application, and the claims appended hereto, a curved line ($\xi$) is employed in the linkage of atoms in any of the formulae set forth herein, it is meant to denote that the connected atom may be either in the alpha or beta position as is determined in the respective compounds involved.)

The preferred acyloxy radicals are those of hydrocarbon carboxylic acids of less than twelve carbon atoms, for example, the lower alkanoic acids (e.g., acetic, propionic, butyric and tert-pentanoic acids), the lower alkenoic acids, the monocyclic aryl lower alkanoic acids (e.g., phenacetic and β-phenylpropionic acid), the cycloalkane carboxylic acids, and the cycloalkene carboxylic acids.

The final products of this invention which are unsubstituted in the 21-position (i.e., where Z is hydrogen) are physiologically active compounds which possess progestational activity and thus may be employed in place of progesterone in the treatment of habitual abortion. Administration can be accomplished in the same manner as progesterone, for example, the dosage being adjusted for the relative potency of the particular steroid. Those final products of this invention which are oxygenated in the 21-position (i.e., Z is hydroxy or acyloxy) are physiologically active compounds which possess mineralocorticoid activity and thus can be employed instead of desoxycorticosterone in the treatment of Addison's disease, for which purpose they may be administered in the same manner as desoxycorticosterone.

The final products of this invention are prepared by the process of this invention which entails a number of steps beginning with a (triterpenoid acid) as the starting material. By a triterpenoid acid, it is here meant a polymethyl steroid having a D ring structure represented by the following formula

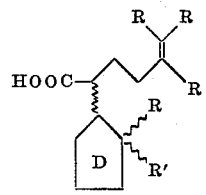

wherein R is selected from the group consisting of hydrogen and lower alkyl and R′ may be the same or different and is selected from the group consisting of hydrogen and hydroxy. Examples of the triterpenoid acids which may be employed in the practice of this invention include eburicoic, elemolic, elemonic, tumulosic, pinicolic and other like acids. The steps of the process (employing eburicoic acid as the starting material) are shown by the following equations wherein R and R′ are the same or different and represent hydrogen or acyl, and R″ represents acyl.

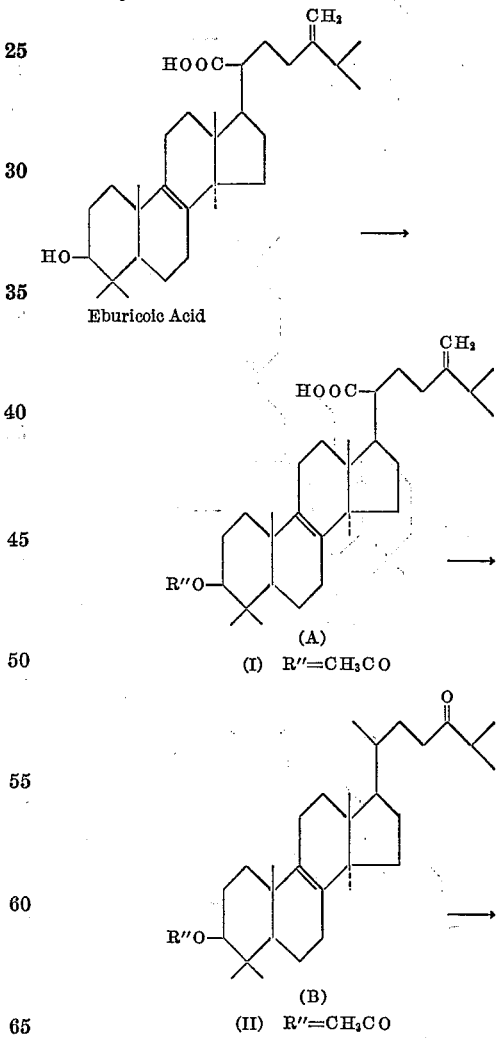

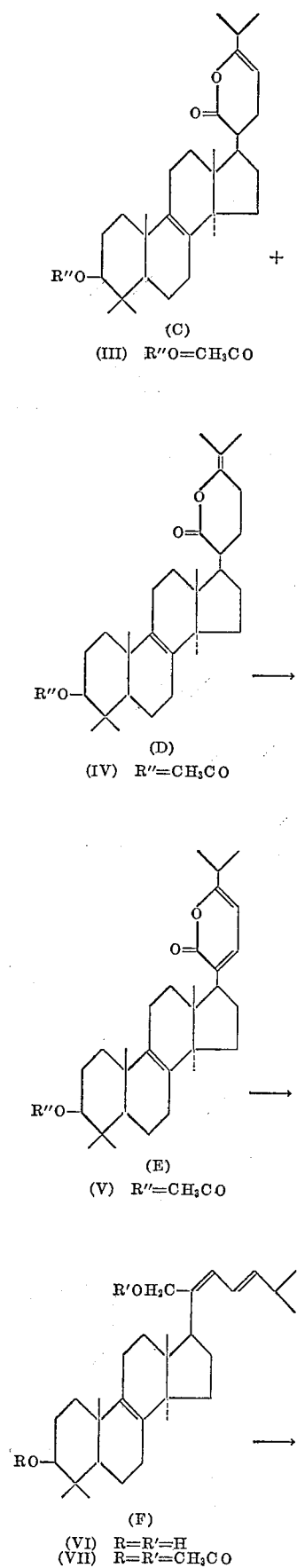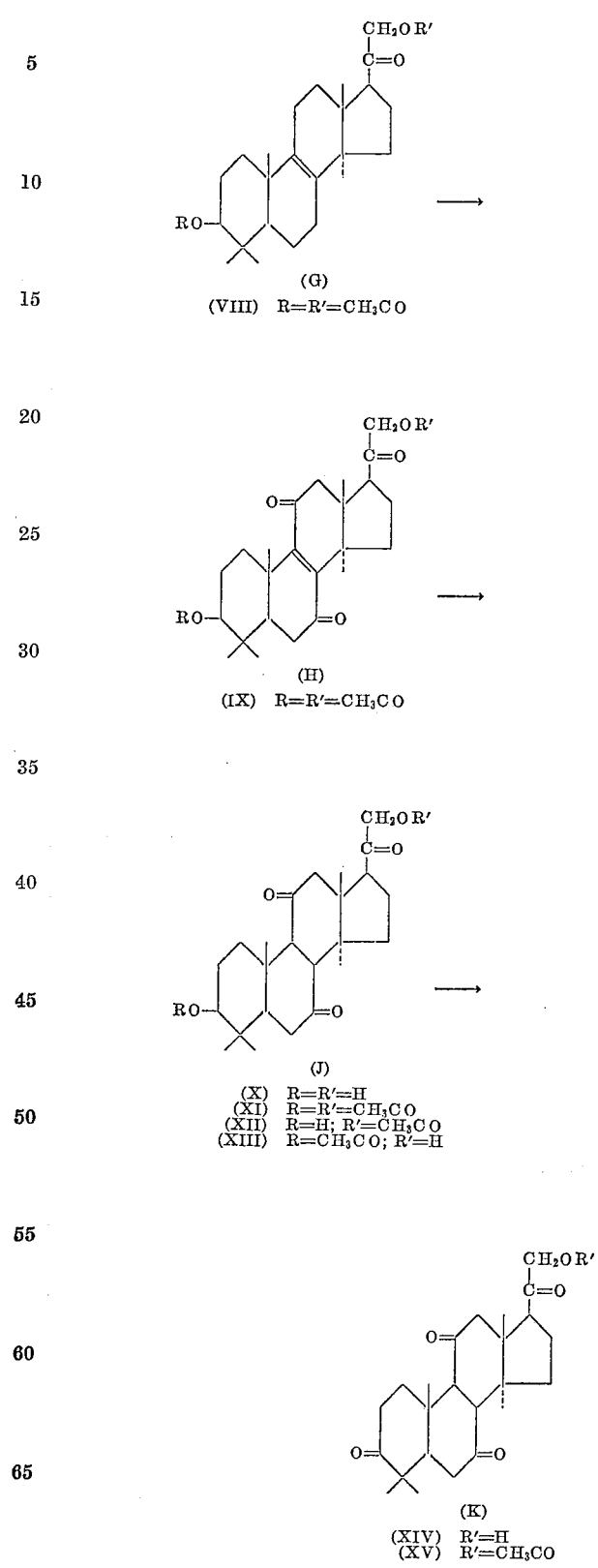
The final products of this invention, wherein Z is hydrogen, are prepared by a process of this invention which entails a number of steps beginning with corresponding 21-hydroxy steroid derivatives as starting materials. These steps are shown by the following equations, wherein Y is hydroxy, acyloxy or oxo (O=), and A is lower alkyl or tolyl:

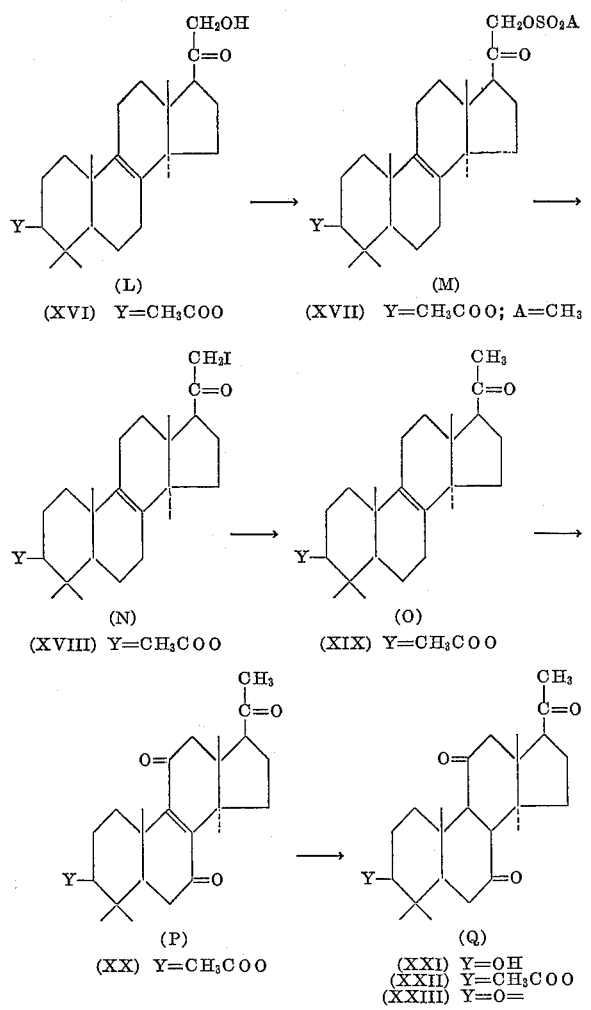

In the first step of this invention the triterpenoid acid (e.g., eburicoic acid in the foregoing equations) is converted to its 3-ester derivative (Compounds A). The 3-acetate of eburicoic acid is a known compound. Other 3-esters can be prepared in the usual manner by reaction with the desired acylating agent (e.g., acyl chloride or acid anhydride) in the presence of a base, such as pyridine. The preferred esters are those with hydrocarbon carboxylic acids of less than twelve carbon atoms, which may be formed by reacting with the acyl chloride or acid anhydride of a hydrocarbon carboxylic acid of less than twelve carbon atoms, such as one of the acids hereinbefore set forth.

The 3-ester is then converted to a corresponding ester of 3 - hydroxy - 24-keto-$\Delta^8$-lanostene-21-oic acid (Compound B). This may be accomplished by ozonolysis of Compounds A and reducing the ozonide formed by treatment with either hydrogen in the presence of a hydrogenation catalyst, e.g., palladium on charcoal, or an electropositive metal, e.g., zinc, in the presence of an acid, e.g., glacial acetic acid.

Compounds B are then lactonized by treatment with an acid anhydride and a salt of a strong base and a weak acid, such as sodium acetate in acetic anhydride, to yield a mixture of the α-lactone (Compounds D) and β-lactone (Compounds E of the corresponding 3-esters of 3β-hydroxy-24-keto-$\Delta^8$-lanostene 21oic acid. The reaction is preferably carried out at an elevated temperature, such as the reflux temperature of the organic solvent employed and the two lactones are separated chromatographically. However, since both the α-lactone and β-lactone give the same product in the next step of the process, such separation is not necessary and a mixture of the lactones may be used directly.

Compounds C and D are then dehydrogenated, as by treatment with palladium on charcoal at an elevated temperature, to yield the corresponding 3-ester of 3β,24-dihydroxy - $\Delta^{8,20(22),23}$ - lanostadiene - 21 - oic acid lactone (Compounds E).

Compounds E are then reduced by treatment with lithium aluminum hydride to yield the corresponding 3β,21-dihydroxy - $\Delta^{8,20(22),23}$ - lanostatriene derivatives (Compounds F).

Compounds F are then oxidized as by treatment with ozone and reduction of the ozonide formed, to yield 3β, 21 - dihydroxy - 4,4,14α-trimethyl-$\Delta^8$-5α-pregnene-20-one (Compounds G).

Compounds G are then oxidized as by treatment with chromium trioxide in glacial acetic acid to produce the 7,11,20-triketone (Compounds H), which are new compounds of this invention.

Compounds H of this invention are then treated with zinc and acetic acid to produce the pregnane-7-11,20-triketones (Compounds J), which are substituted in the 21-position, and which are also new compounds of this invention.

When a 3-ester compound is formed, it may be saponified in the usual manner, as by treatment with a base such as potassium hydroxide to yield the corresponding free 3β-hydroxy derivative, and the free 3-hydroxy compound oxidized to the corresponding 4-keto derivative in the usual manner, as by treatment with chromium trioxide (Compounds K).

If a 21-unsubstituted compound is desired, a compound containing a free 21-hydroxy group (Compounds L) is acylated by treatment with an organic sulfonyl chloride, such as a lower alkanesulfonyl chloride (e.g., mesyl chloride) or tosyl chloride, to yield the corresponding 21-sulfonic acid ester (Compounds L).

The 21-sulfonic acid esters are then converted to their corresponding 21-iodo derivatives (Compounds M) by treatment with an alkali metal iodide (e.g., sodium iodide) preferably at an elevated temperature.

The 21-iodo derivatives are then reduced, as by treatment with sodium bisulfite to produce 21-unsubstituted compounds (Compounds N). These compounds are then oxidized as by treatment with chromium trioxide in glacial acetic acid to produce the 7,11,20-triketone which are new compounds of this invention (Compounds P).

The triketones are then treated with zinc and acetic acid to produce the pregnane-7,11,20-triones, which are new compounds of this invention. When a 3-hydroxy or 3-acyloxy derivative is formed, it may be oxidized to the corresponding 3-keto derivative (after saponification of the 3-ester group, if present) to yield the final 3-keto compounds of this invention (Compounds Q).

Like results as obtained above, with eburicoic acid as the starting material, may also be produced where the same procedure as set forth above is followed, but elemolic, pinicolic, polyporenic or tumulosic acid is substituted for eburicoic acid as the starting material.

The following examples illustrate the invention (all temperatures being in centigrade):

EXAMPLE 1

3β,21-Diacetoxy-4,4,14α-Trimethyl-$\Delta^8$-5α-Pregnene 20-One

A. *Eburicoic acid 3-acetate (I)*.—To a solution of 10 g. of eburicoic acid in 50 ml. of anhydrous pyridine is added 10 ml. of acetic anhydride and the mixture is allowed to remain at room temperature for 18 hours. Five grams of ice are then added and 30 minutes later the mixture is diluted slowly with 250 ml. of ice and water. The resulting precipitate is filtered, washed thoroughly with water, dried in vacuo and recrystallized from 95% alcohol yielding pure eburicoic acid 3-acetate.

Similarly, by substituting other acid anhydrides of acyl halides for the propionic anhydride in the procedure of Example 1, the corresponding 3-esters are formed. Thus, butyric anhydride and benzoyl chloride yield the 3-butyrate and 3-benzoate of eburicoic acid, respectively.

Similarly, treating 10 g. of tumulosic acid according to the procedures set forth in part A, tumulosic acid 3,16-diacetate is obtained.

B. *3β-acetoxy-24-keto-$\Delta^8$-lanostene-21-oic acid (II)*.—Through a solution of 15 g. of eburicoic acid 3-acetate (I) in a mixture of 150 ml. of chloroform and 150 ml. of ethyl acetate, cooled in a Dry Ice-acetone bath, is passed 26.2 l. of ozone (1 mole of ozone contained in .89 l. of oxygen). The resulting solution is allowed to warm to room temperature and then added to a suspension of 975 mg. of pre-reduced 5% palladium on charcoal catalyst in 50 ml. of ethyl acetate. 550 ml. of hydrogen is taken up rapidly, following which the solution is filtered and the filtrate evaporated to dryness in vacuo.

Alternately the ozonide can be decomposed with zinc in acetic acid as follows: The ozonolysis mixture obtained from 50 g. of eburicoic acid 3-acetate in 50 ml. of chloroform and 500 ml. of ethyl acetate, is allowed to warm up to $-10°$ when it is diluted with 50 ml. of glacial acetic acid. Powdered zinc is then added in portions with stirring and the temperature allowed to rise to $+15°$. A total of 25 g. of zinc is required. After 2½ hours the reaction mixture is filtered and the zinc and zinc salts washed thoroughly with ethyl acetate. The ethyl acetate-chloroform filtrate is washed thoroughly with water, dried over sodium sulfate and evaporated to dryness in vacuo. A total of about 56 g. of the crude keto acid IV is obtained.

The acid (II) is obtained in pure form by chromatography on neutral alumina. For this purpose a solution of 14 g. of the crude acid is dissolved in 50 ml. of benzene and charged to the column containing 280 g. of alumina. 50% chloroform benzene (9 l.) elutes about 1.9 g. of pure acid melting at about 234–236°, which is followed by about 1.2 g. of acid when the eluent is changed to 75% chloroform in benzene (3 l.). An additional 1.3 g. of pure acid is obtained with chloroform (5 l.). The column is then stripped with 5% acetic acid in chloroform (2 l.) which elutes about 10.4 g. of crude material which is dissolved in 100 ml. of benzene and rechromatographed on 200 g. of silica gel. Elution with benzene (750 ml.) gives about 4 g. of amorphous material which is followed by crystalline acid (about 2.4 g.) when the eluent is changed to chloroform (8 l.). The pure acid (II) has the following properties:

M.P. 236–238°; $[\alpha]_D^{23} +52°$ (c., .49 in chlf.); $\lambda_{max.}^{CS_2}$ 5.78 and 5.90μ; $\lambda_{max.}^{Nujol}$ 5.83–5.90; 8.05, 9.76 and 9.94μ.

*Analysis.*—Calcd. for $C_{32}H_{50}O_5$ (514.72): C, 74.67; H, 9.79. Found: C, 74.64; H, 9.54.

Similarly, tumulosic acid 3,16 diacetate may be treated in accordance with the procedure set forth in Part B above, yielding 3β,16α-diacetoxy-24-keto-$\Delta^8$-lanostene-21-oic acid.

C. *3β - acetoxy - 24 - hydroxy - $\Delta^{8,23}$ - lanostadiene-21-oic acid lactone (α-lactone) (III) and 3β-acetoxy-24-hydroxy-$\Delta^{8,24}$-lanostadiene-21-oic acid lactone (β-lactone) (IV)*.—To a solution of 15.4 g. of 3β-acetoxy-24-keto-$\Delta^8$-lanostene-21-oic acid (II) in 150 ml. of acetic anhydride is added 3.75 g. of anhydrous sodium acetate and the resulting suspension is heated under reflux for 10 hours. Upon cooling, the acetic anhydride solution is decanted from the sodium acetate and the latter washed thoroughly with benzene. The combined acetic anhydride-benzene solutions are evaporated to dryness in vacuo, the residue redissolved in benzene and filtered from the precipitated sodium acetate. The clear benzene solution is evaporated to dryness leaving a mixture of the α- and β-enol lactones (III and IV) (about 15.1 g.). Separation is achieved by chromatography on neutral alumina as follows: The total residue is dissolved in 50 ml. of benzene and 50 ml. of hexane and charged to a column containing 300 g. of neutral alumina. Elution with 250 ml. of benzene-hexane (1:1) produces about 3.1 g. of crude crystalline 3β-acetoxy-24-hydroxy-$\Delta^{8,23}$-lanostadiene-21-oic acid is lactone (α-lactone) (III), which after crystallization from 95% ethanol is analytically pure and has the following properties:

M.P. about 169–171°; $[\alpha]_D^{23} +37°$; $\lambda_{max.}^{Nujol}$ 5.69, 5.78, 5.93 (weak), 8.05, 12.05, 12.62 and 13.30μ.

The 12.05 and 12.63μ band are diagnostic for the α-lactone and are absent in the β-lactone.

*Analysis.*—Calcd. for $C_{32}H_{48}O_4$ (496.): C, 77.37; H, 9.73. Found: C, 77.41; H, 9.82.

Continued elution of the alumina column with benzene (8 l.) produces a total of about 4 g. of material in 12 fractions, all of which melt between 150–160° and represent a mixture of the α- and β-lactones. Rechromatography of this mixture is necessary to obtain the pure β-lactone. For the purpose all of the fractions are combined (4 g.), dissolved in 20 ml. of benzene and 80 ml. of hexane and charged to a column of 120 g. of neutral alumina. Elution with benzene-hexane (1:4) produces, in the first 500 ml., about 827 mg. of the pure α-lactone (III) which is followed by elution with the same solvent mixture (5.5 l.) and on elution with benzene-hexane (1:1, 2 l.) by a total of about 2.9 g. of material, representing a mixture of α- and β-lactone melting at about 158–160°. Continued elution of the column with benzene (9 l.) yields a total of about 1.2 g. of material which after recrystallization ethanol constitutes pure 3β-acetoxy-24-hydroxy-$\Delta^{8,24}$-lanostadiene-21-oic acid lactone (β-lactone) (IV) (about 404 mg.) possessing the following properties:

M.P. about 190–191°; $[\alpha]_D^{23} +64°$; (c. .87 in chlf.); $\lambda_{max.}^{Nujol}$ 5.70, 5.79, 5.97 (weak), 8.08, 11.50, 11.50, 11.80 and 13.50μ.

The 11.80μ band is absent in the α-lactone.

*Analysis.*—Calcd. for $C_{32}H_{48}O_4$ (496.70): C, 77.37; H, 9.73. Found: C, 77.56; H, 9.73.

Similarly, treating the 3β,16α-diacetoxy-24-keto-$\Delta^8$-lanostene-21-oic acid obtained in part B, in accordance with the procedures set forth in part C, yields 3β,16α-diacetoxy-24-keto $\Delta^{8,23}$-lanostadiene-21-oic acid lactone (α-lactone) and 9β,16α-diacetoxy-24-hydroxy-$\Delta^8$-24-lanostene-21-oic acid lactone (β-lactone).

D. *3β - acetoxy - 24 - hydroxy - $\Delta^{8,20(22),23}$ - lanostatriene-21-oic acid lactone (α-pyrone) (V)*.—A suspension of 180 mg. of 10% palladium on charcoal in 25 ml. of p-cymene is distilled until approximately 3 ml. of solvent have been removed. The final temperature of the vapors is over 170°. 250 mg. of the thoroughly dried α-enol lactone (III) is then added and the resulting suspension heated under reflux with stirring for 2 hours under a blanket of nitrogen. The mixture is cooled, filtered and the solvent removed in vacuo. The residual crystalline material on recrystallization from absolute ethanol furnishes the pure α-pyrone (V) in about 75% yield possessing the following properties:

M.P. about 228–228.5°; $[\alpha]_D^{23} -114°$ (chlf.); $\lambda_{max.}^{alc}$ 305 mμ ($\epsilon = 8,850$); $\lambda_{max.}^{Nujol}$ 5.79, 5.90, 6.11, 6.35, 8.95, 11.90 and 12.69μ.

*Analysis.*—Calcd. for $C_{32}H_{46}O_4$ (494.68): C, 77.69; H, 9.37. Found: C, 77.77; H, 9.43.

When the β-enol lactone (IV) is substituted for the α-lactone (III) in part D and the reaction time is prolonged to 6 hours, the pyrone (V) is obtained in about 60% yield.

Moreover, when a mixture of α- and β-enol lactones (III and IV) (80 g.) is dehydrogenated with 80 g. of 10% palladium on charcoal in 700 ml. of p-cymene for 6 hours, about 50 g. of the pure α-pyrone (V) of M.P. about 226–228° is obtained.

Furthermore, if another ester of eburicoic acid, such as the 3-propionate, the 3-butyrate or the 3-benzoate is substituted for the 3-acetate in the procedures of either part B or part C and the procedures of Examples 1 through 8 are carried out, the corresponding 3-esters are obtained.

Similarly, treating the 3β,16α-diacetoxy lactones obtained in part C, in accordance with the procedures set forth in part D above, yields 3β,16α-diacetoxy-24-hydroxy - $\Delta^{8,20(22),23}$ - lanostatriene - 21 - oic acid lactone (α-pyrone).

E. *3β,21-dihydroxy-$\Delta^{8,20(22),23}$-lanostatriene (VI)*.—A solution of 5 g. of the α-pyrone (V) in 210 ml. of freshly distilled tetrahydrofuran is added over a 15-minute period to a refluxing solution of 5 g. of lithium aluminum hydride in 125 ml. of tetrahydrofuran with stirring under a blanket of nitrogen. Reflux is continued for an additional 2 hours and the solution is cooled to room temperature. Saturated sodium sulfate solution is then added carefully until all the lithium aluminum hydride is decomposed, after which the reaction mixture is shaken with several 200 ml. portions of benzene and the resulting extracts decanted from the inorganic salts until all the organic material is extracted. The benzene-tetrahydrofuran solution is dried over sodium sulfate and evaporated to dryness in vacuo. The resulting residue (about 4.6 g.) is dissolved in 100 ml. of benzene and the solution chromatographed on 100 g. of neutral alumina washing the column with 800 ml. of benzene to remove some impurities. The desired trienediol (VI) is obtained by elution with 2800 ml. of 10% chloroform in benzene. The combined eluates are evaporated to dryness and recrystallized from ether, which results in about 2.06 of the pure trienediol (VI) possessing the following properties:

M.P. about 166–168°; $[\alpha]_D^{23}+68°$ (chlf.); $\lambda_{max}^{alc}$ 244 mμ (ε =32,800); $\lambda_{max}^{Nujol}$ 3.10, 9.71 and 10.40μ.

*Analysis*.—Calcd. for $C_{30}H_{48}O_2$ (440.68): C, 81.76; H, 10.98. Found: C, 81.63; H, 10.91.

Continued elution of the alumina column with chloroform (1.1) elutes about 200 mg. of crystalline material whic hafter recrystallization from acetone has the following properties:

M.P. about 199–200°; $[\alpha]_D^{23}+37°$ (c., .96 in chlf.); $\lambda_{max}^{alc}$ no selective absorption; $\lambda_{max}^{Nujol}$ 3.00μ.

*Analysis*.—Calcd. for $C_{30}H_{52}O_3$ (416.72): C, 78.20; H, 11.38. Found: C, 77.92, 78.25; H, 11.12, 11.33.

This compound represents 3β,21,24 - trihydroxy - $\Delta^8$-lanostene.

Similarly, treating the 3β,16α-diacetoxy-24-hydroxy-$\Delta^{8,(20)22,23}$-lanostatriene-21-oic acid lactone (α-pyrone) obtained in Part D above, according to the procedures of Part E, yields 3β,16α,21-trihydroxy-$\Delta^{8,20(22),23}$-lanostatriene.

F. *3β,21-diacetoxy-$\Delta^{8,20(22),23}$-lanostatriene (VII)*.—A solution of 200 mg. of the triene (VI) in 2 ml. of anhydrous pyridine and 0.2 ml. of acetic anhydride is allowed to stand at room temperature overnight. Removal of the reagents in vacuo leaves a residue on crystallization from methanol furnishes the pure diacetate (VII) possessing the following properties:

M.P. about 131–132° $[\alpha]_D^{23}+87°$ (chlf.); $\lambda_{max}^{alc}$ 241 mμ (ε =32,100) $\lambda_{max}^{Nujol}$ 5.74, 8.02, 8.19, 9.86μ.

*Analysis*.—Calcd. for $C_{34}H_{52}O_4$ (524.75): C, 77.82; H, 9.99. Found: C, 77.75; H, 10.01.

Similarly, if other acylating agents, such as propionic anhydride, butyric anhydride and benzoyl chloride, are substituted for the acetic anhydride in the procedure of Example 12, the corresponding diesters are formed.

Similarly, treating the 3β,16α,21-trihydroxy-$\Delta^{8,20(22),23}$-lanostatriene obtained in part E above, according to the procedures set forth in part F, yields 3β,16α,21-triacetoxy-$\Delta^{8,20(22),23}$-lanostatriene.

G. *3β,21-diacetoxy-4,4,14α-trimethyl - $\Delta^8$-5α - pregnene-20-one (VIII)*.—100 mg. of the trienediol diacetate (VII) is dissolved in 10 ml. of ethyl acetate and ozonized at −25° with 3 mole equivalents of ozone. To the resulting solution are added at room temperature a few drops of acetic acid and then portionwise a total of 1 g. of zinc dust until a negative starch iodide test is observed, which requires about 3 hours. The mixture is then filtered, washed with a saturated salt solution, dried over sodium sulfate and evaporated to dryness in vacuo. A crystalline residue (about 82 mg.) is obtained, which on recrystallization from methanol yields about 37 mg. of material melting at about 182–184°. Further crystallization from methanol furnishes analytical material possessing the following properties:

M.P. about 187–188.5°; $[\alpha]_D^{23}+101°$ (c., .22 in chlf.); $\lambda_{max}^{Nujol}$ 5.73 (shoulder), 5.78, 8.03, 9.30, 9.70 and 9.88μ.

*Analysis*.—Calcd. for $C_{28}H_{42}O_5$ (458.61): C, 73.32; H, 9.23. Found: C, 73.10; H, 9.02.

Treating the 3β,16α,21-triacetoxy-$\Delta^{8,20(22),23}$-lanostatriene obtained in Part F, according to the procedure set forth in Part G, yields 3β,16α,21-triacetoxy-4,4,14α-trimethyl-$\Delta^8$-5α-pregnene-20-one.

EXAMPLE 2

*3β,21-Diacetoxy-4,4,14α-Trimethyl-$\Delta^8$-5α-Pregnene-7,11,20-Trione (X)*

A solution of 23 mg. of 3β,21-diacetoxy-4,4,14α-trimethyl-$\Delta^8$-5α-pregnene-20-one (VIII) in 2 ml. of glacial acetic acid is maintained at a temperature of 77–78°. Into this solution is slowly stirred a solution of 20 mg. of chromium trioxide in 1 ml. of glacial acetic acid over a 20-minute period. After allowing the stirred mixture to react for 25 minutes, it is cooled to room temperature, the bulk of the glacial acetic acid is removed in vacuo and the residue is taken up in water and chloroform. The chloroform extract is then washed three times with water, dried over sodium sulfate and the solvent removed in vacuo. The residue weighs 24 mg. and is readily crystallized from methanol to furnish 18 mg. of 3β,21-diacetoxy - 4,4,14α - trimethyl - $\Delta^8$ - 5α-pregnene-7,11,20-trione possessing the following properties:

M.P. 191–192°; $[\alpha]_D^{23}+107°$; (c., .59 in chlf.); $\lambda_{max}^{alc}$ 268 mμ (ε =8,100); $\lambda_{max}^{Nujol}$ 5.74, 5.82, 6.00, 8.00–8.10 mμ.

*Analysis*.—Calcd. for $C_{28}H_{38}O_7$ (486.59): C, 69.11; H, 7.82. Found: C, 68.82; H, 7.89.

Similarly, treating the 3β,16α,21-triacetoxy-$\Delta^8$-5α-pregnene-20-one obtained in Example 1, according to the procedures set forth in Example 2, yields 3β, 16α,21-triacetoxy-4,4,14α-trimethyl-$\Delta^8$-5α-pregnene-7,11,20-trione.

EXAMPLE 3

*3β-Acetoxy-21-Hydroxy-4,4,14α-Trimethyl-$\Delta^8$-5α-Pregnene-7,11,20-Trione (XII)*

To a solution of 25 mg. of 3β,21-diacetoxy-4,4,14α-trimethyl-$\Delta^8$-5α-pregnene-7,11,20-trione (IX) in 20 ml. of methanol is stirred in under nitrogen, 0.2 ml. of 10% oxygen-free potassium carbonate. After storage at room temperature for 2 hours, 0.02 ml. of glacial acetic acid is added. After the addition of 10 ml. of water, the methanol is removed in vacuo. The mixture is then extracted with chloroform, the chloroform extract is washed with water, dried over sodium sulfate and evaporated to dryness in vacuo. The resulting crystalline residue after recrystallization from methanol furnishes 20 mg. of the pure 3β-acetoxy-21-hydroxy-4,4,14a-trimethyl-$\Delta^8$-5α-pregnene-1,11,20-trione (XII).

Similarly, treating the 3β,16α,21-triacetoxy-4,4,14α-trimethyl-$\Delta^8$-5α-pregnene-7,11,20-trione obtained in Example 2 according to the procedures set forth in Example 3 yields 3β,16α-diacetoxy-21-hydroxy-4,4,14α-trimethyl-$\Delta^8$-5α-pregnene-7,11,20-trione.

EXAMPLE 4

3β-Acetoxy-4,4,14α-Trimethyl-Δ⁸-5α-Pregnene-20-One (XIX)

A. *3β-acetoxy-21-hydroxy-4,4,14α-trimethyl-Δ⁸-5α-pregnene-20-one (XVI).*—To a solution of 45 mg. of 3β,21-diacetoxy-4,4,14α-trimethyl-Δ⁸-5α-pregnene-20-one (VIII) in 20 ml. of methanol is added with stirring under nitrogen .2 ml. of 10% oxygen-free potassium carbonate. After 2 hours at room temperature .02 ml. of glacial acetic acid is added and after the addition of water the methanol is removed in vacuo. The mixture is extracted with chloroform, the chloroform extract washed with water, dried over sodium sulfate and evaporated to dryness in vacuo. The resulting crystalline residue after recrystallization from methanol furnishes about 34 mg. of the pure 3-monoacetate (XX) possessing the following properties: M.P. about 202–204°; $[\alpha]_D^{23}+93°$ (c., .38 in chlf.)

*Analysis.*—Calcd. for $C_{26}H_{40}O_4$ (416.58): C, 74.96; H, 9.68. Found: C, 75.14; H, 9.64.

B. *3β-acetoxy - 21 - mesyloxy-4,4,14α-trimethyl-Δ⁸-5α-pregnene-20-one (XVI).*—To a solution of 38 mg. of the 3β-monoacetate (XVI) in 1 ml. of anhydrous pyridine is added at 0° .055 ml. of methanesulfonyl chloride in .5 ml. of chloroform. The reaction is allowed to remain at 0° for 2¾ hours, after which it is stopped by the additional of a small amount of ice. Chloroform and water are added and after separation of the phases the chloroform solution is washed with dilute sulfuric acid, water and then with dilute sodium bicarbonate keeping the extract cool at all times. The chloroform extract is dried over sodium sulfate, filtered and evaporated to dryness in vacuo leaving the 21-mesylate (XXIX) as a crystalline residue melting at about 109–110°.

C. *3β-acetoxy - 21 - iodo-4,4,14α-trimethyl-Δ⁸-5α-pregnene-20-one* (XVIII).—A solution of 47 mg. of the 21-mesylate (XVII) and 120 mg. of sodium iodide in 1.5 ml. of acetone is refluxed for 10 minutes on the steam bath. Water is added and the mixture is extracted with chloroform. The chloroform extract is washed with water, dried over sodium sulfate and the solvent removed in vacuo. The dry residue represents the 21-iodo Compound (XXXIII), M.P. about 146–149° (blackening at about 185°).

D. *3β-acetoxy-4,4,14α-trimethyl-Δ⁸-5α-pregnene-20-one (XIX).*—To a solution of 47 mg. of the iodo compound (XVIII) in 1 ml. of dioxane is added .9 ml. of a 5% sodium bisulfate solution and the resulting mixture refluxed for 1 hour on the steam cone. Water and chloroform are added and after separation of the layers, the chloroform phase is washed with water, dried over sodium sulfate and evaporated to dryness in vacuo. The residual crystalline material (about 25.5 mg.) on recrystallization from methanol furnishes the pure pregnene derivative (IX) possessing the following properties:

M.P. about 166–167°; $[\alpha]_D^{23}+107°$ (c., .44 in chlf.); $\lambda_{max}^{KBr}$ 5.79, 5.85, 7.97μ.

*Analysis.*—Calcd. for $C_{26}H_{40}O_3$ (400.58): C, 77.95; H, 10.07. Found: C, 76.89; H, 10.16.

Similarly, treating the 3β,16α,21-triacetoxy-4,4,14α-trimethyl-Δ⁸-5α-pregnene-20-one obtained in Example 1, part G, according to the procedures set forth in Example 4, parts A through D, 3β,16α-diacetoxy-4,4,14α-Δ⁸-5α-pregnane-20-one is obtained.

EXAMPLE 5

3β-Acetoxy-4,4,14α-Trimethyl-Δ⁸-5α-Pregnene-7,11,20-Trione (XX)

Following the procedure of Example 2 but substituting 25 mg. of 3β-acetoxy-4,4,14α-trimethyl-Δ⁸-5α-pregnene-20-one (XIX) for the 3β,21-diacetoxy-4,4,14α-trimethyl-Δ⁸-5α-pregnene-20-one (VIII), 3β-acetoxy-4,4,14α-trimethyl-Δ⁸-5α-pregnene-7,11,20-trione is obtained.

Similarly, treating the 3β,16α-diacetoxy-4,4,14α-trimethyl-Δ⁸-5α-pregnene-20-one obtained in Example 4, according to the procedures set forth in Example 5 yields 3β,16α - diacetoxy-4,4,14α-trimethyl-Δ⁸-5α-pregnene-7,11,20-trione.

EXAMPLE 6

3β,21-Diacetoxy-4,4,14α-Trimethyl-5α-Pregnane-7,11,20-Trione (XI)

150 mg. of zinc dust is added portionwise, over a 15-minute period, to a solution of 50 mg. of 3β,21-diacetoxy-4,4,14α-trimethyl-Δ⁸-5α-pregnene-7,11,20-trione (IX) in 4 ml. of glacial acetic acid maintained at 75–85°. The solution is allowed to remain at that temperature for a total of 30 minutes, then cooled, filtered and the solution concentrated to a small volume. Water is added to the mixture which is then extracted with chloroform. The extract is successively washed with water, sodium carbonate and again with water. The washed extract is then dried over sodium sulfate and evaporated to dryness in vacuo. The material is readily crystallized from methanol and consists of 3β,21-diacetoxy-4,4,14α-trimethyl-5α-pregnane-7,11,20-trione.

EXAMPLE 7

3-Acetoxy-4,4,14α-Trimethyl-5α-Pregnane-7,11,20-Trione (XXII)

Following the procedure of Example 6, but substituting 40 mg. of 3β-acetoxy-4,4,14α-trimethyl-Δ⁸-5α-pregnene-7,11,20-trione for the 3β,21-diacetoxy-4,4,14α-trimethyl-Δ⁸-5α-pregnene - 7,11,20 - trione, 3β-acetoxy-4,4,14α-trimethyl-5α-pregnane-7,11,20-trione (XXII) is obtained.

Similarly, treating the 3β,16α-diacetoxy-4,4,14α-trimethyl-Δ⁸-5α-pregnene-7,11,20-trione obtained in Example 5, 3β, 16α-diacetoxy-4,4,14α-trimethyl-5α-pregnane-7,11,20-trione is obtained.

EXAMPLE 8

3β-Acetoxy-21-Hydroxy-4,4,14α-Trimethyl-5α-Pregnane-7,11,20-Trione (XIII)

Following the procedure of Example 3, but substituting 25 mg. of 3β,21-diacetoxy-4,4,14α-trimethyl-5α-pregnane-7,11,20-trione, for the 3β,21-diacetoxy-4,4,14α-trimethyl-Δ⁸-5α-pregnene-7,11,20-trione, 3β-acetoxy-21-hydroxy-4,4,14α-trimethyl-5α-pregnane-7,11,20-trione is obtained (XIII).

Similarly, treating 3β,16α,21 - triacetoxy-4,4,14α-trimethyl-5α-pregnane-7,11,20-trione obtained in Example 6 according to the procedures of Example 3 yields 3β,16α-triacetoxy-21-hydroxy-4,4,14α-trimethyl-5α-pregnane - 7, 11,20-trione.

EXAMPLE 9

3,21-Dihydroxy-4,4,14α-Trimethyl-5α-Pregnane-7,11,20-Trione (X)

A solution of 100 mg. of the diacetate (IX) obtained in Example 6 in 14 ml. of oxygen free 1 N ethanolic KOH is allowed to stand at room temperature for 19 hours with the exclusion of air. At the end of this period, the solution is neutralized with 1 N sulfuric acid, diluted with $H_2O$, the ethanol removed in vacuo and the aqueous suspension extracted with $CCl_4$. The $CCl_4$ extract is dried over sodium sulfate and evaporated to dryness in vacuo. There remains a crystalline residue, which after recrystallization from acetone furnishes 3β,21-dihydroxy-4,4,14α-trimethyl-5α-pregnane-7,11,20-trione (X).

EXAMPLE 10

3β-Hydroxy-21-Acetoxy-4,4,14α-Trimethyl-5α-7,11,20-Trione (XII)

100 mg. of the diol (X) obtained in Example 9 is monoacylated with 1 ml. of a solution containing 28 mg. of acetic anhydride in pyridine (1.1 mole equivalent of acetic anhydride) at room temperature for 18 hours. The reagents are evaporated in vacuo and the crystalline residue is recrystallized from methanol. After two crystallizations 3β - hydroxy - 21 - acetoxy-4,4,14α-trimethyl-5α-pregnane-7,11,20-trione (XII) is obtained.

EXAMPLE 11

*21-Acetoxy-4,4,14α-Trimethyl-5α-Pregnane-3,7,11,20-Tetraone (XV)*

A solution of 80 mg. of the 21-acetate obtained in Example 10 in 8 ml. of acetone is oxidized with 1.0 ml. of a solution containing 20 mg. of chromium trioxide and 32 mg. of concentrated sulfuric acid per milliliter of 90% aqueous acetone. The reaction is allowed to proceed for 15 minutes when excess chromium trioxide is decomposed by the addition of methanol. Water and chloroform are added and the chloroform extract washed with water, dried over sodium sulfate and evaporated to dryness, yielding 21-acetoxy-4,4,14α-trimethyl-5α-pregnane-3,7,11,20-tetraone.

EXAMPLE 12

*21-Hydroxy-4,4,14α-Trimethyl-5α-Pregnane-3,7,11,20-Tetraone (XIV)*

Following the procedure of Example 3 but substituting 25 mg. of 21-acetoxy-4,4,14α-trimethyl-Δ⁸-5α-pregnene-7,11,20-trione, 21-hydroxy-4,4,14α-trimethyl-5α-pregnane-3,7,11,20-tetraone is obtained.

EXAMPLE 13

*3β-Hydroxy-4,4,14α-Trimethyl-5α-Pregnane-7,11,20-Trione (XXI)*

A solution of 100 mg. of the pregnane 3-acetate (XXI) in 4 ml. of oxygen-free 1 N ethanolic KOH is allowed to stand at room temperature for 19 hours with the exclusion of air. At the end of this period the solution is neutralized with 1 N sulfuric acid, diluted with water, the ethanol removed in vacuo and the aqueous suspension extracted with chloroform. The chloroform extract is dried over sodium sulfate and evaporated to dryness in vacuo. There remains a crystalline residue, which after recrystallization from acetone furnishes analytically pure 3β - hydroxy - 4,4,14α - trimethyl - 5α - pregnane - 7,11,20-trione (XXI).

EXAMPLE 14

*4,4,14α-Trimethyl-5α-Pregnane-3,7,11,20-Tetraone (XXIII)*

To a solution of 80 mg. of the pregnane-3-ol (XXI) in 8 ml. of reagent grade acetone is added with stirring 1.0 ml. of a solution containing 20 mg. of chromium trioxide and 32 mg. of sulfuric acid in 90% aqueous acetone. The reaction is allowed to proceed for 15 minutes after which time it is stopped by the addition of a few drops of 95% ethanol. Water is added and the steroid extracted with chloroform. The chloroform extract is dried over sodium sulfate and evaporated to dryness in vacuo. There remains a crystalline residue which, after recrystallization from acetone produces 4,4,14α-trimethyl-5α-pregnane-3,7,11,20-tetraone (XXIII).

EXAMPLE 15

*3β,16α,21-Triacetoxy-4,4,14α-Trimethyl-Δ⁷,⁹⁽¹¹⁾-Pregnadiene-20-One*

Substituting polyporenic acid C for eburicoic acid and treating said polyporenic acid C according to the procedures set forth in Example 1, parts A through G yields, 3β,16α,21 - triacetoxy - 4,4,14α - trimethyl - Δ⁷,⁹⁽¹¹⁾ - pregnadiene-20-one.

EXAMPLE 16

*3β,16α,21-Triacetoxy-4,4,14α-Trimethyl-Δ⁸-Pregnene-7,11,20-Trione*

Treating the 3β,16α,21-triacetoxy - 4,4,14α - trimethyl-Δ⁷,⁹⁽¹¹⁾-pregnadiene-20 obtained in Example 15, according to the procedures set forth in Example 2 yields 3β,16α, 21 - triacetoxy - 4,4,14α - trimethyl - Δ⁸ - pregnene - 7,11, 20-trione.

EXAMPLE 17

*3β,21-Diacetoxy-4,4,14α-Trimethyl-Δ⁸-5α-Pregnene-7,11,20-Trione (X)*

A. *3β - acetoxy - 24 - hydroxy-Δ⁷,²⁰⁽²²⁾,²³-lanostatriene-21-oic acid lactone.*—A solution of 5 g. of 3β-acetoxy-24-hydroxy-Δ⁸,²⁰⁽²²⁾,²³-lanostatriene-21oic acid lactone (V) in 350 ml. of glacial acetic acid is saturated with dry hydrogen chloride gas first at 10° and finally as more HCl dissolves at 0°. This requires a total of 30 minutes. The solution is maintained for an additional hour at 0° and then evaporated to dryness in vacuo. The resulting crystalline residue on recrystallization from 95% ethanol and chloroform furnishes about 3.75 g. (75%) of a mixture consisting largely of the Δ⁷- and some of the Δ⁸-isomer, M.P. 229–231°; [α]_D²³ —135° (chlf.). A sample of this product is chromatographed on acid-washed alumina using a 100:1 ratio of alumina to sample. After elution of the Δ⁸-isomer with chloroform-benzene (1:8) the main fraction is eluted with pure chloroform to give the pure Δ⁷-isomer (IX), which on recrystallization from methanol has the following properties: M.P. 230–230.5°; [α]_D²³ —144° (chlf.).

*Analysis.*—Calcd. for $C_{32}H_{46}O_4$ (494.68): C, 77.69; H, 9.37. Found: C, 77.92; H, 9.40.

B. *3β,21 - diacetoxy - 4,4,14α - trimethyl - Δ⁷ - 5α - pregnene-20-one.*—Treating the 3β - acetoxy - 24 - hydroxy-Δ⁷,²⁰⁽²²⁾,²³-lanostatriene-21-oic acid lacetone obtained in part A above, according to the procedures set forth in Example 1, parts E to G, yields 3β,21-diacetoxy-4,4,14α-trimethyl-Δ⁷-5α-pregnene-20-one.

C. *3β,21 - diacetoxy - 4,4,14α - trimethyl - Δ⁸ - 5α - pregnene-7-11,20-trione (X).*—Treating the 3β,21-diacetoxy-4,4,14α-trimethyl-Δ⁷-5α-pregnene-20-one obtained in part B above, according to the procedures set forth in Example 2, yields 3β,21-diacetoxy-4,4,14α-trimethyl-Δ⁸-5α-pregene-7,11,20-trione.

The invention may otherwise be variously embodied within the scope of the appended claims.

What I claim is:
1. A compound having the formula

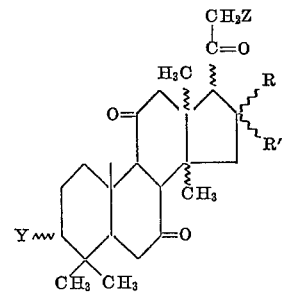

wherein Z is selected from the group consisting of hydrogen, hydroxy and the acyloxy radical of a hydrocarbon carboxylic acid of less than twelve carbon atoms; Y is selected from the group consisting of hydroxy, oxo (O=) and the acyloxy radical of a hydrocarbon carboxylic acid of less than twelve carbon atoms; and each R and R' are selected from the group consisting of hydrogen, hydroxy and the acyloxy radical of a hydrocarbon carboxylic acid of less than twelve carbon atoms.

2. A compound having the formula:

wherein Z is selected from the group consisting of hydrogen, hydroxy and the acyloxy radical of a hydrocarbon carboxylic acid of less than twelve carbon atoms; Y is selected from the group consisting of hydoxy, oxo (O=) and the acyloxy radical of a hydrocarbon carboxylic acid of less than twelve carbon atoms; and each R and R' is selected from the group consisting of hydrogen, hydroxy, and the acyloxy radical of a hydrocarbon carboxylic acid of less than twelve carbon atoms.

3. 3,21-diacetoxy-4,4,14-trimethyl-5α-pregnane-7,11,20-trione.

4. 3 - acetoxy - 21 - hydroxy-4,4,14-trimethyl-5α-pregnane-7,11,20-trione.

5. 3 -acetoxy - 4,4,14 - trimethyl-5α-pregnane-1,11,20-trione.

6. 3,2,1 - diacetoxy - 4,4,14-trimethyl-$\Delta^8$-5α-pregnene-7,11,20-trione.

7. 21 - hydroxy - 4,4,14α-trimethyl-5α-pregnane-3,7,11,20-tetraone.

8. 3β - hydroxy - 4,4,14α-trimethyl-5α-pregnane-7,11,20-trione.

9. 4,4,14α-trimethyl-5α-pregnane-3,7,11,20-tetraone.

10. 21 - acetoxy - 4,4,14α - trimethyl - 5α - pregnane-3,7,11,20-tetraone.

11. 3β,16α,21 - triacetoxy - 4,4,14α - trimethyl-$\Delta^8$-pregnene-7,11,20-trione.

12. 3,21 - dihydroxy - 4,4,14α - trimethyl - 5α - pregnane-7,11,20-trione.

13. 3β - hydroxy - 21 - acetoxy - 4,4,14α - trimethyl-5α-pregnane-7,11,20-trione.

14. 3β,16α,21 - triacetoxy - 4,4,14α-trimethyl-$\Delta^{7,9(11)}$-pregnadiene-20-one.

References Cited in the file of this patent
UNITED STATES PATENTS 3,080,396    Edwards _____ Mar. 5, 1963

OTHER REFERENCES

Chamberlin et al.: Jour. Amer. Chem. Soc. (1953), p. 3477.

Elks: Jour. Chem. Soc. (1954), page 451.

UNITED STATES PATENT OFFICE
CERTIFICATE OF CORRECTION

Patent No. 3,140,301

July 7, 1964

Josef Fried

It is hereby certified that error appears in the above numbered patent requiring correction and that the said Letters Patent should read as corrected below.

Column 6, line 30, for "4-keto" read -- 3-keto --; column 8, line 17, for "$C_{22}H_{48}O_4$" read -- $C_{32}H_{48}O_4$ --; line 48, for "9β,16α" read -- 3β,16α --; column 9, line 43, for "whic hafter" read -- which after --; line 64, for "241 mμ" read -- 242 mμ --; column 10, line 70, for "1,11,20-trione" read -- 7,11,20-trione --; column 12, lines 68 and 69, for "5α-7,11,20-Trione", in italics, read -- 5α-pregnane-7,11,20-Trione --, in italics; column 14, line 27, for "lacetone" read -- lactone --; column 15 line 4, for "hydoxy" read -- hydroxy --; line 14, for "-1,11,20-" read -- -7,11,20- --.

Signed and sealed this 30th day of March 1965.

(SEAL)
Attest:

ERNEST W. SWIDER
Attesting Officer

EDWARD J. BRENNER
Commissioner of Patents